(12) United States Patent
Schneider et al.

(10) Patent No.: US 12,209,047 B2
(45) Date of Patent: Jan. 28, 2025

(54) CERAMIC PRINTING INK, IN PARTICULAR FOR INKJET PRINTING, FOR PRODUCING A COATING ON A GLASS CERAMIC, AND COATED GLASS CERAMIC PANEL

(71) Applicant: SCHOTT AG, Mainz (DE)

(72) Inventors: Meike Schneider, Taunusstein (DE); Jochen Drewke, Bechtolsheim (DE); Stephanie Mangold, Schornsheim (DE); Ina Mitra, Stadecken-Elsheim (DE)

(73) Assignee: SCHOTT AG, Mainz (DE)

( * ) Notice: Subject to any disclaimer, the term of this patent is extended or adjusted under 35 U.S.C. 154(b) by 164 days.

(21) Appl. No.: 18/047,550

(22) Filed: Oct. 18, 2022

(65) Prior Publication Data
US 2023/0117230 A1  Apr. 20, 2023

(30) Foreign Application Priority Data
Oct. 18, 2021 (DE) ............... 10 2021 126 968.7

(51) Int. Cl.
*C03C 17/02* (2006.01)

(52) U.S. Cl.
CPC ........ *C03C 17/02* (2013.01); *C03C 2217/213* (2013.01); *C03C 2218/119* (2013.01)

(58) Field of Classification Search
CPC .............. C03C 17/02; C03C 2217/213; C03C 2218/119; C03C 3/085; C03C 2217/452; C03C 2217/485; C03C 3/087; C03C 3/091; C03C 3/093; C03C 3/095; C03C 3/097; C03C 8/02; C03C 8/04; C03C 8/16; C03C 10/0027; C03C 17/008; C03C 10/00; C03C 17/002; C03C 17/22; C09D 11/037; C09D 11/38; C09D 11/322; H05B 3/74; B41M 1/34
USPC ....................................................... 347/100
See application file for complete search history.

(56) References Cited

U.S. PATENT DOCUMENTS

| 5,747,395 | A | 5/1998 | Smith |
| 6,043,171 | A | 3/2000 | Siebers |
| 6,187,429 | B1 | 2/2001 | Weinberg |
| 6,525,300 | B1 | 2/2003 | Mitra |

(Continued)

FOREIGN PATENT DOCUMENTS

| CA | 2279785 | 2/2000 |
| CN | 104609733 | 5/2015 |

(Continued)

*Primary Examiner* — Jason S Uhlenhake
*Assistant Examiner* — Alexander D Shenderov
(74) *Attorney, Agent, or Firm* — Ruggiero McAllister & McMahon LLC

(57) ABSTRACT

A ceramic printing ink is provided that is suitable for application using an inkjet printing process to produce a coating on glass ceramics. The ink includes a glassy material of glass particles and pigment particles. The glass particles are present in a ratio of total weight to the pigment particles of at least 1.5 and less than 19. The glass particles have an equivalent diameter $d_{90}$ ranging from at least 0.5 μm to at most 5 μm. The ink has an effective coefficient of linear thermal expansion, $\alpha_{20\text{-}300,\mathit{eff}}$, in a range from $6.5 \times 10^{-6}$/K to $11 \times 10^{-6}$/K.

20 Claims, 1 Drawing Sheet

(56) References Cited

U.S. PATENT DOCUMENTS

| | | | |
|---|---|---|---|
| 2003/0096056 A1* | 5/2003 | Kawamura | H01J 9/2278 252/301.36 |
| 2005/0106486 A1 | 5/2005 | Schultheis | |
| 2006/0189470 A1 | 8/2006 | Mitra | |
| 2007/0031603 A1 | 2/2007 | Eron | |
| 2007/0191206 A1 | 8/2007 | Cotlear | |
| 2008/0090034 A1* | 4/2008 | Harrison | C03C 12/00 106/31.13 |
| 2008/0139375 A1 | 6/2008 | Wennemann | |
| 2008/0214379 A1 | 9/2008 | Cotlear | |
| 2009/0214840 A1 | 8/2009 | Eron | |
| 2010/0273631 A1 | 10/2010 | Pelletier | |
| 2011/0226231 A1 | 9/2011 | Siebers | |
| 2012/0263957 A1 | 10/2012 | Chopinet | |
| 2013/0273320 A1* | 10/2013 | Bockmeyer | C03C 8/02 428/147 |
| 2016/0244356 A1 | 8/2016 | Lecomte | |
| 2016/0264455 A1 | 9/2016 | Weber | |
| 2016/0340232 A1* | 11/2016 | Mitra | C03C 3/091 |
| 2017/0240459 A1 | 8/2017 | Gioffreda | |
| 2019/0194054 A1 | 6/2019 | Siebers | |
| 2020/0283333 A1 | 9/2020 | Menke-Berg | |
| 2021/0115281 A1 | 4/2021 | Guedon | |
| 2021/0395543 A1 | 12/2021 | Fernández Vázquez | |

FOREIGN PATENT DOCUMENTS

| | | |
|---|---|---|
| CN | 111072276 | 4/2020 |
| DE | 4201286 | 11/1994 |
| DE | 19512847 | 11/1996 |
| DE | 102004002766 | 10/2008 |
| DE | 102005040588 | 4/2012 |
| DE | 102016216442 | 11/2018 |
| DE | 202021103464 | 7/2021 |
| EP | 0978493 | 9/2002 |
| EP | 2918560 | 9/2015 |
| EP | 1870383 | 9/2018 |
| EP | 3450411 | 3/2019 |
| EP | 3372569 | 5/2020 |
| GB | 2263478 | 7/1993 |
| WO | 2010040443 | 4/2010 |
| WO | 2010137000 | 12/2010 |
| WO | 2015003736 | 1/2015 |
| WO | 2016008848 | 1/2016 |
| WO | 2016110724 | 7/2016 |
| WO | 2019121742 | 6/2019 |
| WO | 2020043929 | 3/2020 |
| WO | 2020099704 | 5/2020 |

* cited by examiner

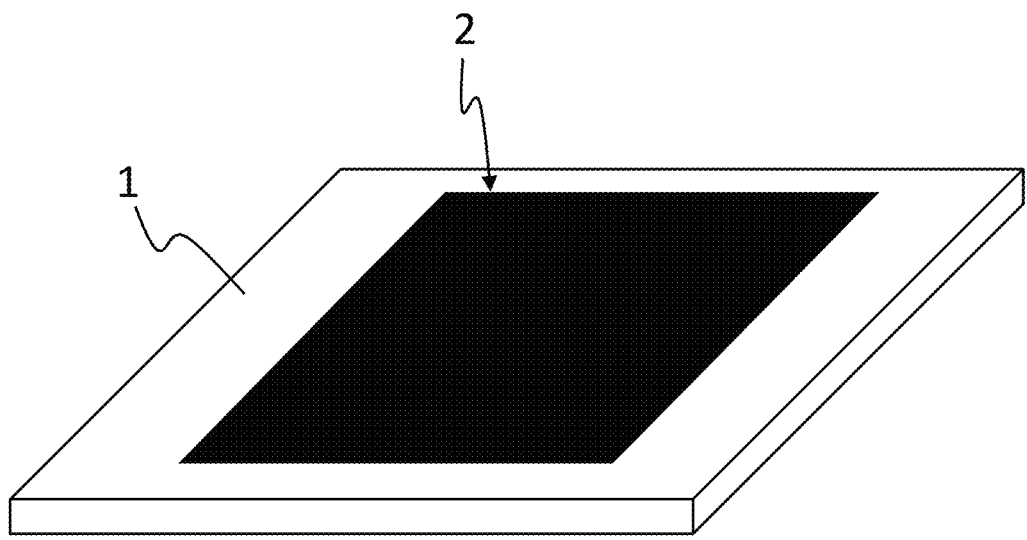

CERAMIC PRINTING INK, IN PARTICULAR FOR INKJET PRINTING, FOR PRODUCING A COATING ON A GLASS CERAMIC, AND COATED GLASS CERAMIC PANEL

CROSS REFERENCE TO RELATED APPLICATIONS

This application claims benefit under 35 USC § 119 of German Application 10 2021 126 968.7 filed Oct. 18, 2022, the entire contents of which are incorporated herein by reference.

BACKGROUND

1. Field of the Invention

The invention generally relates to a ceramic printing ink, in particular an ink that is suitable for being applied by inkjet printing process, preferably in particular a ceramic printing ink for producing a coating on glass ceramics. A further aspect of the invention relates to a glass ceramic panel which comprises a coating, in particular produced or producible using such a printing ink.

2. Description of Related Art

Ceramic printing inks are employed for a variety of applications. In principle, it is also known to apply such printing inks to a glass ceramic, for instance also onto a glass ceramic panel that has a low coefficient of thermal expansion.

Such ceramic printing inks can generally be applied using different processes. Usually, screen printing can be used, for example, but other processes such as inkjet printing are also eligible.

For manufacturing reasons it may be preferable to apply such ceramic inks by screen printing, since this allows to efficiently produce large numbers of printed products. When producing printed glass ceramic panels, it may moreover be preferable to not apply the printing ink to an already ceramized glass ceramic. Rather, usually, precursor products that have not yet been ceramized, also known as "green glasses", are printed, and the ceramic printing ink is fired during ceramization. This is referred to as so-called "primary firing".

In principle, however, it is also possible to print glass ceramic products that have already been ceramized, such as glass ceramic panels, and to fire the ink in what is known as "secondary firing". In fact, this is unfavorable from a manufacturing point of view, since two firing processes will be necessary in this case. However, it may still be advantageous to perform such secondary firing processes, for example for individualizing products.

In addition to the issues of the type of application and the firing of such ceramic printing inks, there are further requirements for the coatings and printed panels obtained using such printing inks.

For example, such printing inks may contain pigments, that is they may be designed as opaque or at least partially opaque coatings which are used to indicate and mark functional areas, for example, such as cooking zones or display areas, especially if the product in question is a glass ceramic panel which is intended to be used as a cooking panel, for example.

Since such coatings can sometimes be subjected to considerable stress in daily use, for example thermal stress or abrasive stress, sufficient adhesion of the resulting coating is furthermore required.

Moreover, it is known that such printing inks or the coatings obtained using them can impair the strength of the printed substrate.

Therefore, a number of requirements are placed on printing inks for glass ceramic panels. They not only need to be suitable for a specific application process and high temperatures, but also have to provide for sufficient adhesion and scratch resistance of the coating, i.e. durability of the coating in general to mechanical and/or abrasive attacks on a substrate, but must not impair the mechanical strength of the substrate too much.

For this purpose, a number of solutions have been proposed.

U.S. patent application US 2016/0244356 A1 discloses a glass ceramic article which is at least partially provided with an enamel coating. The coating comprises only little pigment in an amount of less than 5 wt %.

U.S. patent application US 2012/0263957 A1 discloses an enamel composition comprising between at least 40 wt % and at most 65 wt % of pigment.

U.S. patent application US 2007/0031603 discloses a digital inkjet printer for printing on glass. Precise information on the composition of the printing ink is not given.

U.S. patent application US 2020/0283333 A1 discloses coated glass or glass ceramic substrates with high temperature resistance and high strength and a low coefficient of thermal expansion. The coating has closed pores with a size between 0.1 µm and 30 µm and a thickness between 1.5 µm and 50 µm.

U.S. patent application US 2016/0340232 A1 discloses a glass flux for producing an opaque coating and a coated glass substrate having such a coating. The glass flux includes at least one pigment. The glassy components of the disclosed glass flux have a coefficient of thermal expansion of more than $4.7 \cdot 10^{-6}/K$.

International patent application WO 2016/008848 A1 describes a ceramic inkjet printing ink for low-expansion glass and/or for low-expansion glass ceramics.

U.S. patent application US 2008/0139375 A1 discloses a glass ceramic panel with a black decorative color. The glass flux of the decorative paint is black and the decorative paint furthermore includes between 0 and 10 wt % of a black pigment.

U.S. patent application US 2007/0191206 A1 describes a body made of glass or glass ceramics which can be subjected to a high thermal load and which is decorated with a paint comprising a molten silicate and effect pigments based on $SiO_2$ platelets. The document does not contain any statements on the thermal expansion coefficients of the coating. The layers are applied using screen printing.

U.S. patent application US 2008/0214379 A1 also discloses a glass ceramic or glass element that can be subjected to high thermal loads and which is decorated. The decoration is produced using a metallic paint that includes an effect pigment and a molten silicate. The effect pigment is in the form of synthetic $Al_2O_3$ platelets.

U.S. Pat. No. 6,525,300 B1 discloses a coated glass ceramic panel. The coating is a glass-based coating which significantly differs in terms of its coefficient of thermal expansion from that of the low-expansion glass ceramic.

European patent specification EP 0 978 493 B1 discloses lead-free and cadmium-free glass compositions which can be used for decorating glasses and glass ceramics, and a method for producing a glass ceramic coated with such glass compositions.

U.S. Pat. No. 6,043,171 discloses lead-free and cadmium-free glass compositions for glazing, enameling, and decorating glass or glass ceramics.

German patent specification DE 42 01 286 C2 discloses the use of lead-free and cadmium-free glass compositions for glazing, enameling, and decorating purposes, and their compositions.

German patent specification DE 195 12 847 C1 discloses lead-free and cadmium-free glass compositions for use in glazes and enamels. The glazes and enamels are suitable for coating glasses. Glass ceramics are not addressed as a substrate material.

U.S. Pat. No. 6,187,429 B1 discloses decorative ceramic paint layers which are applied to glass or glass ceramic substrates. To improve adhesion, this patent specification describes the addition of fillers such as micas to the ceramic paint.

U.S. Pat. No. 5,747,395 discloses glass compositions containing cobalt for producing coatings. Due to the cobalt content of the glass, the coatings have a blue color.

U.S. patent application US 2021/0115281 A1 discloses a mineral ink for inkjet printing.

U.S. patent application US 2010/0273631 A1 discloses a reinforced glass ceramic article and an enamel suitable for coating such an article. The coating can be done without adding pigments to the enamel and is intended to introduce stress into the surface of the glass ceramic article.

International patent application WO 2016/110724 A1 discloses a composition of a glass frit and a ceramic inkjet printing ink comprising such a glass frit. The coating is in particular suitable for coating a substrate material in the form of glass.

International patent application WO 2020/043929 A1 discloses ceramic inks for digital inkjet printing and a method for producing such inks. The printing inks are in particular intended for use on a substrate material in the form of glass.

U.S. patent application US 2009/0214840 A1 discloses an ink for producing an etching effect by printing ceramic surfaces, in particular glass surfaces.

International patent application WO 2015/003736 A1 discloses a ceramic inkjet ink, in particular for printing on glass substrates.

U.S. patent application US 2016/0264455 A1 discloses a substrate which is provided with a glass-based, noise-optimized coating. The substrate can comprise or be made of glass or glass ceramics.

U.S. patent application US 2013/0273320 A1 discloses a coated glass or glass ceramic substrate with haptic properties. The haptic properties are achieved by texture-imparting particles in the coating.

U.S. patent application US 2006/0189470 A1 discloses a lead-free and cadmium-free glass for glazing, for enameling, or for decorating glasses and glass ceramics. In this way it is possible to achieve high flexural strength of the coated substrate.

European patent EP 3 372 569 B1 discloses an enamel composition and a method for producing enameled glass ceramic articles. The enamel composition has a very high pigment content of more than 50 wt %.

European patent specification EP 1 870 383 B1 discloses alkali-free and cadmium-free glass frits and their use for producing ceramic paints.

German patent specification DE 10 2016 216 442 B4 discloses a coated substrate with a decoration optimized in terms of its friction coefficient. The decoration is based on glass. Furthermore, the patent specification relates to a method for producing such a decoration and to its use.

German patent specification DE 10 2005 040 588 B9 discloses the use of a lead-free and cadmium-free glass and a method for glazing, enameling, and decorating so-called lithium aluminosilicate glass ceramics.

German patent specification DE 10 2004 002 766 B4 discloses a glass ceramic panel which has at least one frosted area and a method for producing it. For producing the frosted effect, a glass flux is applied which includes no pigments.

None of the aforementioned prior art documents discloses a ceramic printing ink which is suitable for inkjet printing and in which the individual components are adapted to each other such that the glass particles of the printing ink and the pigment used in the printing ink are matched in terms of their coefficient of thermal expansion. Moreover, the majority of the prior art documents mostly relate to printing processes such as screen printing and to what is known as primary firing for producing glass-based coatings on glass ceramics.

Hence, there is a need for ceramic printing inks in particular for being applied using an inkjet printing process, preferably in particular for producing a coating on a glass ceramic, which ink should be employable flexibly, in particular it should also be possible to be fired by secondary firing, should ensure sufficient strength of a coated glass ceramic article, and should also exhibit sufficient adhesion and resistance to mechanical loads.

SUMMARY

The object of the invention is to provide a ceramic printing ink which at least partially overcomes or mitigates the problems of the prior art outlined above.

Accordingly, the present disclosure relates to a ceramic printing ink, in particular for being applied by an inkjet printing process, preferably in particular for producing a coating on a glass ceramic. The printing ink comprises at least one glassy, i.e. vitreous, material comprising glass particles, and at least one pigment comprising pigment particles. The ratio of the total weight of glass particles contained in the printing ink to the total of pigment particles contained in the printing ink is between at least 1.5 and less than 19.

BRIEF DESCRIPTION OF THE FIGURES

The sole FIGURE is a schematic view, not true to scale, of a glass ceramic panel according to the present disclosure.

DETAILED DESCRIPTION

The sole FIGURE is a schematic view, not true to scale, of a glass ceramic panel 1 according to embodiments, which comprises a coating 2. Coating 2 can in particular be obtained using a ceramic printing ink according to embodiments of the present disclosure.

Generally, within the context of the present disclosure, a printing ink for being applied by an inkjet printing process refers to a printing ink that can be printed using common inkjet printers intended in particular for ceramic printing inks. More particularly, in the context of the present disclosure, this means a printing ink, in particular a ceramic printing ink, which has properties in the following parameter ranges:

| Parameter | Minimum | Maximum |
|---|---|---|
| Z number | 1.5 | 4.2 |
| Weber number | 12 | 48 |
| Viscosity index | 0.98 | 1.05 |
| Surface tension | 20 mN/m | 40 mN/m |

It should be noted here that, for inkjet printing processes, various parameters and properties of the medium to be printed have to be taken into account. Therefore, properties of the print medium such as viscosity, surface tension and density, for example, are not considered individually, but in their interaction. For example, the so-called Z number can be used for this purpose, which is the inverse of Ohnesorge number.

It is defined as follows:

$$Z = \frac{\sqrt{\rho \sigma d}}{\eta}.$$

Weber number (We for short) is defined as follows:

$$We = \frac{\rho v^2 d}{\sigma}.$$

Here, f is the viscosity, in Pa·s, at a shear rate of greater than or equal to 1000/s, $\sigma$ is the surface tension in N/m, $\rho$ is the density in kg/m$^3$, d is the characteristic length (nozzle diameter) in m, and v is the drop velocity in m/s.

Z and We are related through the Reynolds number. The viscosity index is a measure of how Newtonian a fluid is and whether it is likely to change viscosity when printed. To this end, a viscosity curve is determined at the printing temperature (which is generally between 10° C. and 40° C., preferably about 25° C.).

The glass particles have an equivalent diameter $d_{90}$ which is in the range from at least 0.5 m to at most 5 µm, preferably an equivalent diameter $d_{97}$ in the range from at least 0.5 µm to at most 5 µm, most preferably an equivalent diameter $d_{97}$ in the range from at least 0.5 µm to not more than 2.5 µm.

The resulting effective coefficient of linear thermal expansion, $\alpha_{20-300,eff}$, based on the glass particles and pigment particles contained in the printing ink, is in a range from 6.5*10$^{-6}$/K to 11*10$^{-6}$/K.

A preferred upper limit for the resulting effective coefficient of linear thermal expansion $\alpha_{20-300,eff}$ is 10*10$^{-6}$/K, more preferably less than 9.5*10$^{-6}$/K, and most preferably at most 9*10$^{-6}$/K or even less than 9*10$^{-6}$/K.

Preferably, the effective coefficient of linear thermal expansion $\alpha_{20-300,eff}$ is given by the following formula:

$\alpha_{20-300,eff}=\Sigma$(weight percentage of glassy material $i*\alpha_{20-300,glassy\ material\ i}$)+$\Sigma$(weight percentage of pigment $z*\alpha_{20-300,pigment\ z}$).

The weight percentage is based on the total weight of solids in the printing ink (i.e. on the solids content of the printing ink) in each case, i.e. including all glassy materials and pigments.

According to one embodiment, the ceramic printing ink is free of lead. This means that, apart from impurities caused by technical reasons, the ceramic printing ink—and accordingly the coating on the glass ceramic panel—contains PbO as a constituent in a maximum amount of 500 ppm based on weight, preferably up to a maximum amount of 200 ppm, based on weight.

According to a further embodiment, the printing ink does not comprise any blowing agent. In the context of the present disclosure, blowing agent refers to agents which decompose upon temperature increase to form a fluid phase, for example agents which split off gas. Such blowing agents can also be referred to as foaming agents. As mentioned, the ceramic ink of the present disclosure preferably does not include such a blowing agent.

Such an embodiment of a printing ink is very advantageous.

In the present case, the printing ink is a ceramic ink. In the context of the present application, ceramic ink refers to an ink which has an inorganic structure, that is to say it comprises at least 95 wt % of inorganic components after having been fired. Such a ceramic ink may in particular be glass-based, for example in the form of what is known as an enamel ink.

By providing the ink of the present disclosure in the form of a printing ink, it is possible to apply the printing ink in a laterally structured manner, i.e. in the form of a pattern, for example. This in particular allows to apply markings to a substrate.

In the present case, the printing ink is preferably designed for inkjet printing. This is also advantageous, because in this way no printing stencils have to be produced, such as a screen for so-called screen printing. Rather, the predefined print image can be specified digitally, so that such a procedure is particularly favorable for producing small numbers of items or for the individualization of products.

The printing ink of the present disclosure comprises at least one glassy material. In the context of the present disclosure, glassy, i.e. vitreous, material refers to an amorphous, inorganic, non-metallic material which was obtained or can be obtained by a melting process. The glassy material comprises glass particles, i.e. it is preferably in the form of a powder. Furthermore, the printing ink comprises at least one pigment comprising pigment particles. In the context of the present disclosure, pigment refers to a color body, in particular a ceramic color body. In the context of the present disclosure, ceramic pigments are those pigments which are inorganic, preferably inorganic and non-metallic. Examples of suitable pigments in the context of the present application include spinel pigments, but also TiO$_2$ or Fe$_2$O$_3$. Such ceramic color bodies are not only capable of withstanding the firing conditions that occur during firing of a ceramic ink, but can also be subjected to high temperatures during the use of a product coated in this way, for example a glass ceramic, without the pigment decomposing. The pigment comprises pigment particles, i.e. it is preferably also in the form of a powder.

Furthermore, it is possible and may even be preferred for the ceramic ink to comprise more than one glassy material and more than one pigment.

According to the present disclosure, it is furthermore contemplated that the ratio of the total weight of the glass particles contained in the printing ink to the total of pigment particles contained in the printing ink is between at least 1.5 and less than 19. This corresponds to a proportion of glass particles of at least more than 60 wt % and at most 95 wt %, based on the weight of the glass particles and pigment particles contained in the printing ink. Preferably, this proportion of glass particles can be between at least 80 wt % and at most 90 wt %.

This is very advantageous because, in this way, sufficient mechanical resistance of a resulting coating is achieved on a substrate such as a glass ceramic panel. This is because the glassy material or optionally the several glassy materials are effective as a binder so as to ensure an adequate bond between the substrate and the pigment particles. However, a drawback of such a high proportion of glassy material or materials is that the strength of the coated substrate might be adversely affected in this way. The proportion of the glassy component or optionally of the glassy components should therefore not be excessively high and is preferably limited to a maximum of 95 wt %, preferably a maximum of 90 wt %, based on the total weight of the glassy material or glassy materials and the pigment or pigments. In this way, sufficient opacity or visibility of the coating is still ensured, which can be relevant for safety reasons, for example if the ceramic printing ink according to the present disclosure is intended to mark technical areas, such as operating panels or the like. This can be especially relevant, for example, if a glass ceramic panel for use as a cooking surface or cooking panel is to be coated with the printing ink.

Glass ceramic panels according to the invention can be used in a wide variety of applications.

In one embodiment, a glass ceramic panel can be used as a cooking panel in a cooking appliance.

In a further embodiment, a glass ceramic panel can be used to cover a user interface in a control panel for controlling at least one household appliance, in particular a cooking appliance, an oven, a refrigerator or an extractor hood.

In a refinement of this embodiment, the control panel can be designed to control a plurality of household appliances, for example a cooking appliance, an oven, and an extractor hood. An extractor hood can also be integrated into a cooking appliance that includes a corresponding cooking panel made of glass ceramics, namely in the form of a so-called downdraft extractor hood. For this purpose, the glass ceramic panel may have a recess into which the downdraft extractor hood can be inserted.

In a further embodiment, the glass ceramic panel may be in the form of a cover for an extractor hood, in particular for a downdraft extractor hood. In particular in modular cooking systems, downdraft extractor hoods can be designed as a separate module without a cooking function. However, since such modules must be suitable for being used in combination with modules having a cooking function, they must also meet the very high thermal and chemical requirements that are common for glass ceramics. In addition, such modules may also have a user interface for controlling the downdraft extractor.

In a further embodiment, the glass ceramic panel can be in the form of a cover for an extractor hood. In this embodiment, it can be particularly aesthetically pleasing if the cooking surface of the cooking appliance and the cover of the extractor hood comprise the same glass ceramic panel. This embodiment is particularly advantageous if the extractor hood has a user interface arranged behind the glass ceramic panel for controlling the extractor hood, or a user interface for combined control of the extractor hood and the cooking appliance.

In ovens, in particular pyrolysis ovens, the glass ceramic panel can be used as part of a door glazing.

In a further embodiment, a glass ceramic panel can be used in kitchen furniture, in particular in a kitchen cabinet, in a fitted kitchen, or in a cooking table as a worktop.

In a further embodiment, a glass ceramic panel can be used as a splash guard panel for kitchens. For example, it can be used in the form of a panel as the back wall of a kitchen, for example instead of a tile backsplash. It can also be provided as a free-standing splash guard panel on a cooking island. Such a splash guard panel can either be firmly mounted or can be designed to be retractable. Retractable splash guard panels can be extended when operating a cooking appliance to be effective as a splash guard. Once the cooking process has been completed, they can then be retracted, for example into the cooking appliance or into the worktop. In this case, it can be particularly aesthetically pleasing if both the cooking panel of the cooking appliance and the splash guard panel include a glass ceramic panel according to the invention. In addition, the worktop of the kitchen may also include the same glass ceramic panel.

Splash guard panels for kitchens are regularly splashed with hot liquids such as salt water or vegetable or animal fats during cooking. They are also periodically cleaned using chemical cleaning agents. Since the glass ceramic panels according to the invention are very durable both thermally and chemically, they are particularly well suited for use as a splash guard panel for kitchens.

According to a further embodiment, a glass ceramic panel can be used in laboratory equipment, in particular as a heating panel, in an oven, a balance, or in a piece of laboratory furniture, in particular an extractor hood, a cabinet, or in a table to cover a user interface, or as a worktop.

In a further embodiment, a glass ceramic panel can be used as a fireplace viewing window, as a viewing window for combustion chambers and other high-temperature processing chambers, as fireproof glazing, as part of a casing for mobile electronic devices, in particular cellular phones and tablet computers, as a cover for IR radiant heaters or gas burners, in particular in gas-operated barbecue grills, as a screen, or as a cover for induction charging stations, for example for motor vehicles in the automotive sector, for example in the dashboard area or center console.

Due to its thermal and chemical resistance, the glass ceramic panel can be used in both indoor and outdoor fireplaces. Such fireplaces can be fired with gas, wood, or pellets, for example.

High-temperature processing chambers can include vacuum coating systems, for example.

The glass particles have an equivalent diameter $d_{90}$ ranging from at least 0.5 μm to at most 5 μm, preferably an equivalent diameter $d_{97}$ ranging from at least 0.5 μm to at most 5 μm, most preferably an equivalent diameter $d_{97}$ ranging from at least 0.5 μm to not more than 2.5 μm. This is advantageous, since in this way very fine particles are provided, which are well suited for being printed, even in an inkjet printing process, without clogging the printing heads. Here, equivalent diameter refers to the diameter of a sphere of the same volume as that of the particle under consideration, based on the volume of a particle. Hence, this is what is known as the volume equivalent spherical diameter.

Such an implementation with the respective equivalent diameters is very advantageous.

In fact, it is easily possible in this way to obtain a dense layer, especially when respecting the equivalent diameter of the pigment particles used and contained in the ceramic ink. Thus, it is possible to obtain a very smooth layer which allows to clean the coating more easily. This is of particular importance if the coating concerned is to be applied on a glass ceramic panel which is intended for use as a cooking surface or cooking panel. Furthermore, smaller particles also reduce the firing extent or firing duration, since the particles melt more homogeneously in this way.

The resulting effective coefficient of linear thermal expansion, $\alpha_{20-300,eff}$, based on the glass particles and pigment particles contained in the printing ink, is in a range from $6.5*10^{-6}$/K to $11*10^{-6}$/K. In this way, it is still possible to ensure sufficient strength of the substrate coated with such a printing ink, including a glass ceramic substrate.

At the same time, it is possible in this way to use vitreous, i.e. glassy materials, for example glass fluxes, which can also be used under the conditions of a secondary firing process.

The effective coefficient of linear thermal expansion, $\alpha_{20-300,eff}$, is preferably obtained according to the following formula:

$$\alpha_{20\text{-}300,eff} = \Sigma(\text{weight percentage of glassy material } i * \alpha_{20\text{-}300, glassy\ material\ i}) + \Sigma(\text{weight percentage of pigment } z * \alpha_{20\text{-}300, pigment\ z}).$$

In other words, this means that the respective weight percentage of a glassy material or of a pigment based on the total weight which is the total weight of the glassy material or glassy materials and of the pigment or pigments, has to be multiplied by the respective coefficient of linear thermal expansion, and according to this preferred embodiment, the effective (or resultant) coefficient of linear thermal expansion of the ink is then given by the sum of these products.

With this embodiment, a ceramic printing ink is now provided which makes it possible to adjust the coefficient of linear thermal expansion which is obtained based on the solid constituents of the printing ink, i.e. the glassy material(s) and pigment(s). Thus, an adjustment of the resulting or effective coefficient of linear thermal expansion of the printing ink is already easily possible during the development of the ink. For example, for a given pigment, for example in order to achieve a particular color or a particular advantageous other property such as a specific hardness of the layer or the like, it is possible in this way to selectively chose the vitreous material and/or to match and adjust the ratios of the individual materials, which have an impact on the effective coefficient of linear thermal expansion of the printing ink.

Here, glassy or vitreous component of the printing ink in particular means that the glassy material is or can be provided in the form of a glass flux or glass frit. It is possible that the glassy material is added to the ink in the form of glass frit or glass flux. However, it may also be possible to add the individual constituents of the glassy material in the form of components or precursor products, so that the glassy material only forms during the firing process.

According to one embodiment, the glass particles comprise a glass having a coefficient of linear thermal expansion $\alpha_{20300}$ of at least $5*10^{-6}$/K and at most $11*10^{-6}$/K. This is advantageous because in this way a printing ink is resulting which allows to obtain well-adhering layers, for example on a glass ceramic substrate. On the other hand, these are moreover vitreous materials which can usually also be fired in a so-called secondary firing process, which means that they already melt at lower firing temperatures.

According to one embodiment it is therefore suggested that the printing ink can be fired at a temperature of 830° C. or less, preferably 750° C. or less, and preferably at least 500° C.

An excessive firing temperature is unfavorable for economic reasons, but is also unfavorable from a manufacturing point of view, since if the firing temperatures are too high, a glass ceramic product could further ceramize or deform, for example, so that product specifications might no longer be met. The firing temperature should therefore not be too high and is preferably 830° C. or less, more preferably 750° C. or less. On the other hand, a minimum firing temperature of at least 500° C. is preferable. In fact, this ensures that a good adhesive bond is created between the vitreous material and the substrate on the one hand and preferably also between the individual constituents of the ceramic printing ink per se.

According to a further embodiment, the pigment particles contained in the printing ink have an equivalent diameter $d_{90}$ of at least 0.5 μm and at most 5 μm. It is advantageous if the employed pigment particles are not too large, because excessively large pigment particles cannot be printed well and could lead to clogging of nozzles in particular in inkjet printing. However, the particles should not be too small in order to ensure sufficient opacity and color strength. It is therefore advantageous if the $d_{90}$ of the pigment particles based on the equivalent diameter is at most 5 μm, but at least 0.5 μm.

According to yet another embodiment, the glass particles have a softening point between 500° C. and 800° C. Preferably, the softening point of the glass particles is between 500° C. and 700° C. In this way, adequate wetting of the pigment particles can be ensured even at relatively low temperatures, i.e. in a secondary firing process.

According to yet another embodiment, the glass particles comprise or are made of a glass containing at least 15 wt % of $SiO_2$ and at most 72 wt % of $SiO_2$. $SiO_2$ is a well-known glass-forming component which is also able to give a glass sufficient chemical resistance. The glass should therefore have a $SiO_2$ content of at least 15 wt %. However, since $SiO_2$ also increases melt viscosity and melting temperature, the $SiO_2$ content of the glassy material should not be too high and is therefore preferably at most 72 wt %.

According to a further embodiment, the glass particles comprise or are made of a glass containing $Na_2O$, with a proportion of $Na_2O$ of preferably at least 0.5 wt % and most preferably not more than 11 wt %. $Na_2O$ is a well-known glass component that is effective as a network modifier and lowers the melting temperature. The glass particles or the vitreous material can therefore comprise or be made of a glass which comprises $Na_2O$ as a component. It can be advantageous if the $Na_2O$ content of the glass is at least 0.5 wt %. However, the $Na_2O$ content of the glass should not be too high, as this can reduce chemical resistance. Also, this leads to an increase in the thermal expansion coefficient. Overall, it has therefore proven to be advantageous if the $Na_2O$ content of the glass of the glass particles or glassy material is not too high. Preferably, it is at most 11 wt %.

A further aspect of the present disclosure relates to a glass ceramic panel which comprises a coating. The coating is preferably a coating produced or at least producible from a printing ink according to an embodiment. The coating comprises at least one glassy phase and pigment particles, and the weight percentage of the pigment particles in the coating is between at least 5 wt % and less than 40 wt %. The pigment particles are dispersed in the glassy phase.

The effective coefficient of linear thermal expansion, $\alpha_{20-300,eff}$ is preferably resulting according to the following formula:

$$\alpha_{20\text{-}300,eff} = \Sigma(\text{weight percentage of glassy material } i * \alpha_{20\text{-}300, glassy\ material\ i}) + \Sigma(\text{weight percentage of pigment } z * \alpha_{20\text{-}300, pigment\ z}).$$

The coating preferably has a porosity of less than 5 vol %, more preferably of less than 1 vol %, yet more preferably of less than 0.5 vol %, and most preferably less than 0.1 vol %. In other words, the coating preferably exhibits low porosity. It may in particular also be very advantageous if not only the pore volume of the coating is low, as stated above, but if also the pores have only a small equivalent diameter, in particular an equivalent diameter of at most 200 nm, preferably an equivalent diameter of less than 100 nm. Such a coating with only low porosity and with preferably only small, in particular closed pores allows to obtain particularly dense, scratch-resistant and well-adhering coatings. Also, such coatings usually exhibit high abrasion resistance and good chemical resistance, especially when compared to coatings that have open pores on the surface. In fact, it is precisely in open pores that impurities and particles can settle and will then not only be a problem when cleaning, but might also contribute to further degradation of the coating. With the glass ceramic panel according to embodiments, this is advantageously avoided by having low porosity, preferably purely closed porosity. Here, "dense" does not only refer to mass density (usually specified in $g/cm^3$), but also to the property of the coating to be able to act as a barrier against the passage of fluids. The fewer pores and in particular the fewer open pores the coating has, the better the impermeability of the coating to the passage of fluids such as water or water vapor.

The formation of pores in coatings can advantageously be verified by evaluating scanning electron micrographs. Advantageously, in this case, the magnification is selected such that a 10 μm sized section is visualized. Such images allow to sufficiently visualize even very small pores. The porosity can then be evaluated by a statistical analysis of pore-free and pore-containing portions of the scanning electron micrograph. In such a section, which corresponds to a 10,000-fold magnification, the coating preferably comprises not more than one pore within an area of 10 μm×10 mm.

Generally, the coating has a resulting effective coefficient of linear thermal expansion, $\alpha_{20-300,eff}$, in the range from $6.5*10^{-6}/K$ to $11*10^{-6}/K$. This is advantageous, especially in combination with an embodiment of the coating with only very low porosity, because in this way a dense, strong coating can be achieved on a glass ceramic panel without critically impairing the strength of the coated glass ceramic panel.

In the context of the present application, pores are understood to mean cavities in the coating, which cavities can be open or can be closed. Generally, pores can arise in coatings, especially in glass-based or in particulate coatings, for example in pigmented coatings, by being produced in a targeted manner, for example by using a so-called blowing agent which decomposes during firing and forms a gas which then creates a cavity. However, it is likewise possible that pores are not intentionally created, but result from bubbles that were included in a liquid coating agent or formed in the coating film resultant after the coating process when such a coating agent was applied onto the substrate. Such pores can also result from cavities between particulate constituents, for example due to incomplete melting of particles or due to incomplete wetting of pigments or pigment particles.

It can therefore be particularly advantageous if the glassy material or materials of the printing ink, from which the coating is formed when a coating film produced by the printing ink on the substrate is fired, is designed so as to ensure the most complete melting possible at the aforementioned firing temperature. To this end, it can moreover be particularly helpful if the glass particles of the glassy material have a relatively small grain size, preferably within the limits specified for the printing ink according to embodiments. Also, it can be preferable for the grain size distribution to be quite narrow, i.e. to preferably have only a slight deviation in the grain size from the mean value, since this allows to ensure a homogeneous melting behavior. Larger, incompletely melting particles can thus be largely avoided or at least minimized, which has a positive effect on the porosity, i.e. in particular leads to the fact that few and if so only small pores are obtained. This can in particular be accomplished by skillfully adjusting the composition of the glassy material and therefore of the glassy phase of the coating. However, this can advantageously also be achieved by not having an excessive proportion of pigment in the coating. In fact, it is ensured in this way that the glassy material (which forms the glassy phase of the coating) can envelop the pigment particles the most completely possible upon melting, so that few, in particular few open pores are obtained.

According to one embodiment, the glassy phase, i.e. the glassy or vitreous phase of the coating, has a coefficient of linear thermal expansion $\alpha_{20-300}$ of at least $5*10^{-6}/K$ and preferably up to not more than $11*10^{-6}/K$. This is advantageous because in this way it is possible to obtain an overall relatively low-expansion coating which does not too much reduce the strength of a glass ceramic panel provided with such a coating. Therefore, this embodiment can in particular also be advantageously combined with an embodiment of the glass ceramic panel in which the coating has only a very low porosity, as explained above.

According to a further embodiment, the glassy phase of the coating has a softening point between 500° C. and 800° C., preferably between 500° C. and 750° C.

Here, it should generally be pointed out that the glassy phase results from or is formed by the glassy material(s) of the printing ink, usually as a homogeneous phase. Thus, the coefficient of linear thermal expansion of the glassy materials contained in the printing ink can be different from that of the glassy phase of the coating that is being formed.

However, if the printing ink comprises only a single glassy material, the glassy phase of the coating will correspond to that of the glassy material and the coefficient of linear thermal expansion of the glassy material will correspond to the coefficient of linear thermal expansion of the glassy phase of the coating, apart from measurement-related inaccuracies.

According to yet another embodiment, the pigment particles contained in the coating have an equivalent diameter $d_{90}$ of at least 0.5 μm and at most 5 μm. As stated above, this has the advantage that the coating can be applied by inkjet printing. Furthermore, the pigment particles are designed such that they can be well enveloped, i.e. wetted, by the glassy phase and as completely as possible during the firing process in which the glassy materials or glassy material of the printing ink melts and forms the glassy phase of the coating. Furthermore, good processability and good opacity of the coating are ensured in this way.

According to yet another embodiment, the coating has a thickness from 1 μm to 4 m, preferably from 1.5 μm to 3.5 μm. Such a thickness ensures sufficient resistance of the coating to mechanical attack without too much reducing the mechanical strength of the glass ceramic panel. Such a layer thickness therefore also allows to produce a coating with only a small pore volume, as described above.

Therefore, such coatings according to embodiments are in particular also suitable for glass ceramic panels which comprise or are made of a glass ceramic having a low coefficient of thermal expansion, such as so-called LAS glass ceramics. According to one embodiment, the glass ceramic of the glass ceramic panel has a coefficient of linear thermal expansion in the range from 20° C. to 700° C., $\alpha_{GC,20-700}$, of less than $3*10^{-6}$/K, preferably less than $2*10^{-6}$/K. Such glass ceramics can in particular be used for glass ceramic panels that are subjected to high thermal stresses during operation, for example as a cooking surface or as a fireplace viewing window.

A glass ceramic panel according to the present disclosure can have a thickness between 1 mm and 10 mm, preferably between 2 mm and 7 mm, and most preferably between 3 mm and 5 mm.

Suitable pigments for a printing ink according to the present disclosure can in particular include oxidic materials, for example spinel-based pigments, i.e. pigments of a general formula $AB_2O_4$ with different dopants. Suitable oxide-based pigments can have a coefficient of linear thermal expansion α between about $6.5*10^{-6}$/K and $14*10^{-6}$/K.

EXAMPLES

Some examples of printing ink compositions according to the present disclosure are given in the table below. The specified constituents are the solid components, i.e. without taking into account other fluid components such as solvents or the like.

The percentages given in the table are based on weight of the total solids content of the printing ink in each case. "α" is the coefficient of linear thermal expansion determined in the temperature range from 20° C. to 300° C. Also given is the effective coefficient of linear thermal expansion $\alpha_{20-300,eff}$, here abbreviated as "$\alpha_{eff}$". The coefficients of linear thermal expansion are given in units of $10^{-6}$/K in each case.

| Example # | Flux No. | α | % | Pigment 1 Type | α | % | Pigment 2 Type | α | % | $\alpha_{eff}$ |
|---|---|---|---|---|---|---|---|---|---|---|
| A | 1 | 9.1  | 75 | $TiO_2$    | 8.8  | 25 |           |      |    | 9.03 |
| B | 2 | 9.4  | 85 | $MgAl_2O_4$| 9.0  | 15 |           |      |    | 9.34 |
| C | 3 | 8.7  | 71 | $MgMn_2O_4$| 8.7  | 15 | $Co_3O_4$  | 9.3  | 14 | 8.78 |
| D | 4 | 6.52 | 63 | $CoFe_2O_4$| 12.1 | 25 | $TiO_2$   | 8.8  | 12 | 8.19 |
| E | 6 | 8.15 | 60 | $Co_3O_4$  | 9.3  | 32 | $TiO_2$   | 8.8  | 8  | 8.57 |
| F | 7 | 7.34 | 78 | $CuCr_2O_4$| 10.9 | 12 | $Co_3O_4$  | 9.3  | 10 | 7.96 |
| G | 8 | 8.11 | 82 | $MgMn_2O_4$| 8.7  | 8  | $Co_3O_4$  | 9.3  | 10 | 8.28 |
| H | 9 | 5.37 | 65 | $CuCr_2O_4$| 10.9 | 15 | $CoFe_2O_4$| 12.1 | 20 | 7.54 |
| I | 1 | 9.1  | 78 | $Co_3O_4$  | 9.3  | 10 | $TiO_2$   | 8.8  | 12 | 9.08 |
| J | 2 | 9.4  | 85 | $MgMn_2O_4$| 8.7  | 10 | $TiO_2$   | 8.8  | 5  | 9.30 |
| K | 1 | 9.1  | 92 | $TiO_2$    | 8.8  | 8  |           |      |    | 9.08 |
| L | 3 | 8.7  | 83 | $CoFe_2O_4$| 12.1 | 12 | $TiO_2$   | 8.8  | 5  | 9.11 |
| M | 3 | 8.7  | 92 | $CuCr_2O_4$| 10.9 | 8  |           |      |    | 8.88 |
| N | 2 | 9.4  | 73 | $MgAl_2O_4$| 9.0  | 15 | $TiO_2$   | 8.8  | 12 | 9.27 |

The fluxes used in the table above are detailed in the table below. Here, again, the coefficient of linear thermal expansion is determined in the temperature range from 20° C. to 300° C. and given in units of $10^{-6}$/K. The density is given in g/cm³. $T_g$ stands for the glass transition temperature, SP for the softening point, and WP for the working point. These temperatures are given in ° C. in each case. The composition of the glass fluxes is given in wt % on an oxide basis.

| Flux | 1 | 2 | 3 | 4 | 5 | 6 | 7 | 8 | 9 |
|---|---|---|---|---|---|---|---|---|---|
| Density | 2.66 | 2.55 | 2.52 | 2.78 | 2.62 | 4.49 | 2.50 | 4.75 | 2.35 |
| α | 9.1 | 9.4 | 8.7 | 6.52 | 7.69 | 8.15 | 7.34 | 8.11 | 5.37 |
| $T_g$ | 470 | 533 | 510 | 535 | 500 | 487 | 491 | 495 | 474 |
| SP | 575 | 724 | 690 | 726 | 689 | 599 | 686 | 581 | 657 |
| WP | 742 | 1033 | 1000-1030 | 984 | 975 | 830 | 1002 | 889 | 1017 |
| $SiO_2$ | 47.5 | 69.5 | 65.3 | 47 | 51 | 19.9 | 55.4 | 16.1 | 67 |
| $B_2O_3$ | 19 |  | 1.4 | 12 | 19.5 | 12.2 | 16.3 | 9.6 | 17.5 |
| $Al_2O_3$ | 2 |  | 2.1 | 10 | 3.4 | 0.6 | 7 | 0.5 | 9.5 |
| $Li_2O$ | 4 |  |  | 2 | 4 |  | 2.1 |  | 3.7 |
| $Na_2O$ | 7.5 | 8.1 | 9.8 | 2 | 2.4 | 5.3 | 3.7 | 4.3 | 0.3 |
| $K_2O$ | 4 | 8.4 | 6.3 |  | 7.6 | 0.14 | 3.8 | 0.17 | 0.9 |
| MgO |  |  | 0.5 |  |  |  | 0.4 |  | 0.1 |
| CaO | 1 | 6.8 | 2.6 |  |  |  | 1 |  | 0.3 |
| SrO |  |  |  |  |  |  | 3.3 |  |  |
| BaO | 2 | 2.1 |  | 17 |  |  | 0.16 |  |  |
| ZnO | 8.75 | 4.5 |  | 10 | 1 | 3.9 | 0.2 | 10.2 |  |
| $TiO_2$ | 3.8 | 0.4 |  |  | 0.1 | 2.6 |  | 5.9 | 0.05 |
| $ZrO_2$ |  |  |  |  |  | 10.6 | 3.3 | 3.1 | 2.6 |
| $CeO_2$ |  |  |  |  |  |  |  |  |  |
| $SnO_2$ |  |  |  |  |  |  | 0.12 |  | 5.6 |
| $La_2O_3$ |  |  |  |  |  |  |  | 0.25 |  |
| $Bi_2O_3$ |  |  |  |  |  |  |  | 50 | 42 |
| $As_2O_3$ |  |  |  |  |  |  |  |  |  |
| $Sb_2O_3$ | 0.2 | 0.5 |  |  |  |  |  |  |  |
| $Mn_2O_3$ |  |  | 10.5 |  |  |  |  |  |  |

-continued

| Flux | 1 | 2 | 3 | 4 | 5 | 6 | 7 | 8 | 9 |
|---|---|---|---|---|---|---|---|---|---|
| $Fe_2O_3$ | | | 2.2 | | | | | | |
| CoO | | | 0.2 | | | | | | |
| $HfO_2$ | | | | | 0.2 | 0.07 | 0.06 | 0.05 | |
| $Nb_2O_3$ | | | | | | | 0.9 | | |

The ceramic inks according to the present application can be used for a variety of glass ceramic panels. The composition of the glass ceramics is not particularly restricted, and in principle both volume-colored and non-volume-colored glass ceramics can be used. Also, the ceramic printing inks according to the present application can be applied on transparent glass ceramics as well as on opaque or translucent glass ceramics.

The following table lists exemplary compositions of known prior art glass ceramics which can, in principle, be coated with a ceramic printing ink according to the present disclosure. Such suitable glass ceramics are known, for example, from the following documents: WO 2010/040443 A1, EP 3450411 A1, WO 2019/121742 A1, CN 111072276 A1, WO 2010/137000 A1, DE 20 2021 103 464 U1, or CN 104609733 A1.

| Example | 1 | 2 | 3 | 4 | 5 | 6 | 7 | 8 | 9 | 10 |
|---|---|---|---|---|---|---|---|---|---|---|
| $Li_2O$ | 3.4 | 3.45 | 3.5 | 4.4 | 3.5 | 3.8 | 4.2 | 4.35 | 3.6 | 5.6 |
| $Al_2O_3$ | 18.9 | 20 | 19 | 21.8 | 21.1 | 21.5 | 22.2 | 19.6 | 19.5 | 18.2 |
| $SiO_2$ | 69 | 67.4 | 70.8 | 64.9 | 65.4 | 66.5 | 65.75 | 67.9 | 65.8 | 61 |
| $TiO_2$ | 2.6 | 3.1 | | 2.1 | 2.25 | 2.4 | 2.05 | 2.95 | 4.3 | |
| $ZrO_2$ | 1.7 | 1.3 | 3 | 1.8 | 1.58 | 1.7 | 2.05 | 1.5 | 1 | |
| $SnO_2$ | | | | 0.3 | | 0.3 | 0.2 | | | |
| $As_2O_3$ | 0.6 | 0.8 | 1 | | | | | 0.8 | 1 | |
| $Sb_2O_3$ | | | | | 1 | | | | | |
| $P_2O_5$ | | | | 2 | | | 1.3 | | | 2.4 |
| $B_2O_3$ | | | | | | | | | 2 | |
| $Na_2O$ | | 0.17 | | 0.4 | 0.8 | 0.5 | 0.5 | 0.1 | 0.3 | |
| $K_2O$ | | 0.19 | | 0.2 | 0.25 | 0.2 | 0.2 | 0.5 | | 4.1 |
| MgO | 1.2 | 1.2 | 1 | 0.4 | | 0.9 | 1.05 | | 1.8 | |
| CaO | | | | 0.5 | | | 0.5 | | | |
| BaO | 0.8 | 0.8 | | 1.2 | 2.35 | 1 | | 0.8 | | |
| ZnO | 1.6 | 1.62 | 1.7 | | 1.3 | 1.5 | | 1.6 | 2.2 | 5.2 |
| $V_2O_5$ | 0.2 | | | | 0.45 | | | | | |
| $WO_3$ | | | | | | | | | | 3.5 |
| * | | | | | 0.29 | | | | | |
| $\alpha_{50-700}$ | | | | | | | | | | 2.96 |
| $\alpha_{20-700}$ | | -0.8 | -0.3 | -0.29 | -0.1 | 0.01 | 0.15 | 0.6 | 2.3 | |
| $\alpha_{25-700}$ | -1 | | | | | | | | | |

* Total of the following components: CoO, $Fe_2O_3$, $MnO_2$, NiO.

Glass ceramics 1 and 2 as well as 8 to 10 are translucent, while glass ceramics 3 to 7 are transparent.

| Example | 11 | 12 | 13 | 14 | 15 | 16 |
|---|---|---|---|---|---|---|
| $Li_2O$ | 3.74 | 3.22 | 3.71 | 3.8 | 3.8 | 3.73 |
| $Al_2O_3$ | 21.29 | 19.80 | 20.9 | 20.4 | 20.3 | 21.34 |
| $SiO_2$ | 65.21 | 66.90 | 65.14 | 65.4 | 65.3 | 65.16 |
| $TiO_2$ | 3.64 | 2.68 | 3.10 | 3.1 | 3.0 | 3.64 |
| $ZrO_2$ | 0.90 | 0.64 | 1.34 | 1.4 | 1.4 | 0.91 |
| $SnO_2$ | 0.28 | 0.2 | 0.24 | 0.3 | 0.3 | 0.278 |
| $As_2O_3$ | | | | | 0.08 | |
| $Cr_2O_3$ | 0.0035 | | | | 0.025 | 0.003 |
| $P_2O_5$ | 0.052 | | | 0.1 | 0.1 | 0.052 |
| $MnO_2$ | 0.021 | | 0.025 | 0.03 | 0.02 | 0.02 |
| $Na_2O$ | 0.56 | 0.78 | 0.59 | 0.6 | 0.6 | 0.57 |
| $K_2O$ | 0.41 | 0.20 | 0.22 | 0.25 | 0.2 | 0.41 |
| MgO | 0.31 | 0.81 | 0.37 | 0.3 | 0.4 | 0.3 |
| CaO | 0.44 | 0.21 | 0.42 | 0.4 | 0.5 | 0.44 |
| BaO | 1.31 | 2.42 | 2.30 | 2.2 | 2.4 | 1.31 |
| ZnO | 1.58 | 1.16 | 1.50 | 1.5 | 1.4 | 1.59 |
| $V_2O_5$ | 0.0026 | | 0.026 | 0.028 | 0.016 | 0.0015 |
| $MoO_3$ | 0.046 | 0.043 | | 0.17 | | 0.054 |
| $Fe_2O_3$ | 0.089 | 0.110 | 0.085 | 0.09 | 0.14 | 0.092 |
| $\alpha_{50-700}$ | | | | | | |
| $\alpha_{20-700}$ | 0.14 | | | | | |
| $\alpha_{25-700}$ | | | | | | |

Glass ceramics 11 to 16 are transparent, volume-colored. Glass ceramic 16 exhibits a light transmittance of 2.8% at a thickness of 4 mm.

Glass ceramics 1 through 16 can in particular be provided in the form of a panel, preferably with a thickness from 3.5 to 4.5 mm. The panels may have a polished or rolled surface. Furthermore, they may have a glassy zone on their surface, especially if the surface is not polished. Unpolished surfaces may also be provided without a glassy zone. The glass ceramic may be nubbed on one face to increase breaking strength, in particular on the face opposite the printed face.

One example of a ceramic printing ink according to the present disclosure is given below:

| | |
|---|---|
| Glass frit 1 | 32.98 wt % |
| Black pigment $CuCr_2O_4$ | 1.05 wt % |
| White pigment $TiO_2$ | 0.87 wt % |
| Di(propylene glycol) methyl ether | 62.71 wt % |
| Additive 1 | 2.09 wt % |
| Additive 2 | 0.30 wt %. |

Additive 1 is poly(oxy-1,2-ethanediyl),alpha-methyl-omega-phosphate. Additive 2 is polyether modified polymethylsiloxane. The resulting effective coefficient of linear thermal expansion, $\alpha_{20\text{-}300,\mathit{eff}}$, obtained here based on the glass particles and pigment particles contained in the printing ink, is $9.15*10^{-6}$/K.

The ceramic printing ink was used for applying a coating onto an already ceramized glass ceramic using an inkjet printing process. To this end, a type 11 glass ceramic panel, smooth on both faces, with a thickness of 4 mm and a size of 50×50 cm$^2$ was printed and then fired. The weight percentage of pigment particles in the coating was 5.5%. Porosity was less than 5 vol %.

The glass ceramic of which the glass ceramic panel is made, can advantageously have a coefficient of linear thermal expansion in the range from 20° C. to 700° C., $\alpha_{GC,20\text{-}700}$, which is from –0.5 to $2*10^{-6}$/K, preferably from 0 to $1*10^{-6}$/K, most preferably from 0.1 to $0.5*10^{-6}$/K.

LIST OF REFERENCE NUMERALS

1 Glass ceramic panel
2 Coating

What is claimed is:

1. A ceramic printing ink, comprising
    a glassy material comprising glass particles and at least one pigment comprising pigment particles;
    a ratio of a total weight of the glass particles to a total of the pigment particles between at least 1.5 and less than 19; and
    a resulting effective coefficient of linear thermal expansion, $\alpha_{20\text{-}300,\mathit{eff}}$, in a range from $6.5*10^{-6}$/K to $11*10^{-6}$/K,
    wherein the glass particles have an equivalent diameter $d_{90}$ ranging from at least 0.5 µm to at most 5 µm.

2. The ceramic printing ink of claim 1, wherein the glass particles have an equivalent diameter $d_{97}$ ranging from at least 0.5 µm to at most 5 µm.

3. The ceramic printing ink of claim 1, wherein the glass particles have an equivalent diameter $d_{97}$ ranging from at least 0.5 µm to not more than 2.5 µm.

4. The ceramic printing ink of claim 1, wherein the effective coefficient of linear thermal expansion $\alpha_{20\text{-}300,\mathit{eff}}$ is equal to:

$$\alpha_{20\text{-}300,\mathit{eff}} = \Sigma(\text{weight percentage of glassy material } i * \alpha_{20\text{-}300,\mathit{glassy\ material}\ i}) + \Sigma(\text{weight percentage of pigment } z * \alpha_{20\text{-}300,\mathit{pigment}\ z}).$$

5. The printing ink of claim 1, wherein the glass particles comprise a glass having a coefficient of linear thermal expansion $\alpha_{20\text{-}300}$ of at least $5*10^{-6}$/K and at most $11*10^{-6}$/K.

6. The printing ink of claim 1, further comprising a firing temperature of 830° C. or less.

7. The printing ink of claim 1, wherein the pigment particles a second equivalent diameter $d_{90}$ of at least 0.5 µm and at most 5 µm.

8. The printing ink of claim 1, wherein the glass particles have a softening point between 500° C. and 800° C.

9. The printing ink of claim 1, wherein the glass particles have a softening point between 500° C. and 750° C.

10. The printing ink of claim 1, wherein the glass particles comprise or are made of a glass comprising at least 15 wt % of SiO$_2$ and at most 72 wt % of SiO$_2$.

11. The printing ink of claim 1, wherein the glass particles comprise or are made of a glass comprising Na$_2$O present in with a proportion of at least 0.5 wt % and not more than 11 wt %.

12. A coated glass ceramic panel, comprising:
    a glass ceramic panel; and
    a printed ink coating on the glass ceramic panel, the printed ink coating comprising a glassy material and pigment particles dispersed in the glassy material,
    wherein the printed ink coating has the pigment particles present in a weight percentage between at least 5 wt % and less than 40 wt %,
    wherein the printed ink coating has a porosity of less than 5 vol %, and
    wherein the glassy material and the pigment particles provide the printed ink coating with a coefficient of linear thermal expansion, $\alpha_{20\text{-}300,\mathit{eff}}$, in a range from $6.5*10^{-6}$/K to $11*10^{-6}$/K.

13. The coated glass ceramic panel of claim 12, wherein the porosity is less than 0.1 vol %.

14. The coated glass ceramic panel of claim 12, wherein the glassy material has a coefficient of linear thermal expansion $\alpha_{20\text{-}300}$ of at least $5*10^{-6}$/K and not more than $11*10^{-6}$/K.

15. The coated glass ceramic panel of claim 12, wherein the glassy material has a softening point between 500° C. and 800° C.

16. The coated glass ceramic panel of claim 12, wherein the pigment particles have an equivalent diameter $d_{90}$ of at least 0.5 µm and at most 5 µm.

17. The coated glass ceramic panel of claim 12, wherein the printed ink coating has a thickness from 1 µm to 4 µm.

18. The coated glass ceramic panel of claim 12, wherein the printed ink coating has a thickness from 1.5 µm to 3.5 µm.

19. The coated glass ceramic panel of claim 12, wherein the glass ceramic panel has a coefficient of linear thermal expansion in the range from 20° C. to 700° C., $\alpha_{GC,20\text{-}700}$, from –0.5 to $2*10^{-6}$/K.

20. The coated glass ceramic panel of claim 12, wherein the glass ceramic panel has a coefficient of linear thermal expansion in the range from 20° C. to 700° C., $\alpha_{GC,20\text{-}700}$, from 0.1 to $0.5*10^{-6}$/K.

* * * * *